United States Patent
Xu et al.

(10) Patent No.: US 11,463,648 B1
(45) Date of Patent: Oct. 4, 2022

(54) IMAGE SENSOR WITH THREE READOUT APPROACH FOR PHASE DETECTION AUTOFOCUS AND IMAGE SENSING PHOTODIODES THROUGH MULTIPLE COLUMN BITLINES

(71) Applicant: OMNIVISION TECHNOLOGIES, INC., Santa Clara, CA (US)

(72) Inventors: Chengcheng Xu, San Jose, CA (US); Rui Wang, San Jose, CA (US); Wei Deng, Sunnyvale, CA (US); Chun-Sheng Yang, Cupertino, CA (US); Xueqing Wang, Milpitas, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/342,375

(22) Filed: Jun. 8, 2021

(51) Int. Cl.
  *H04N 5/378* (2011.01)
  *H04N 5/232* (2006.01)
  *H04N 5/374* (2011.01)
  *H04N 5/369* (2011.01)

(52) U.S. Cl.
  CPC ....... *H04N 5/378* (2013.01); *H04N 5/232122* (2018.08); *H04N 5/36961* (2018.08); *H04N 5/374* (2013.01)

(58) Field of Classification Search
  CPC ......... H04N 5/23212; H04N 5/232122; H04N 5/36961; H04N 5/374; H04N 5/378; H03M 1/00–1/007
  See application file for complete search history.

(56) References Cited

U.S. PATENT DOCUMENTS

| | | | |
|---|---|---|---|
| 2010/0208114 A1* | 8/2010 | Kwon | H03M 3/474 348/308 |
| 2014/0145067 A1* | 5/2014 | Suh | H04N 5/3742 250/208.1 |
| 2015/0077608 A1* | 3/2015 | Sakurai | H04N 5/3658 348/302 |
| 2020/0161352 A1 | 5/2020 | Takahashi et al. | |
| 2020/0366863 A1* | 11/2020 | Etou | H04N 5/3745 |
| 2022/0078364 A1* | 3/2022 | Kim | H04N 5/3745 |

* cited by examiner

*Primary Examiner* — Lin Ye
*Assistant Examiner* — Chriss S Yoder, III
(74) *Attorney, Agent, or Firm* — Perkins Coie LLP

(57) ABSTRACT

An imaging device includes a photodiode array with a first and second photodiodes. First and second floating diffusions are configured to receive charge from the first and second photodiodes, respectively. An analog to digital converter (ADC) is configured to receive simultaneously first and second bitline signals from the first and second floating diffusions, respectively. The ADC is configured to generate a reference readout in response to the first and second bitline signals after a reset operation. The ADC next generates a first half of a phase detection autofocus (PDAF) readout in response to the first and second bitline signals after charge is transferred from the first PDAF photodiode to the first floating diffusion. The ADC then generates a full image readout in response to the first and second bitline signals after charge is transferred from the second photodiode to the second floating diffusion.

37 Claims, 5 Drawing Sheets

FIG. 2

IMAGE SENSOR WITH THREE READOUT APPROACH FOR PHASE DETECTION AUTOFOCUS AND IMAGE SENSING PHOTODIODES THROUGH MULTIPLE COLUMN BITLINES

BACKGROUND INFORMATION

Field of the Disclosure

This disclosure relates generally to image sensors, and in particular but not exclusively, relates to image sensors that include phase detection autofocus and image sensing pixels.

Background

Image sensors have become ubiquitous and are now widely used in digital cameras, cellular phones, security cameras as well as in medical, automotive, and other applications. As image sensors are integrated into a broader range of electronic devices, it is desirable to enhance their functionality, performance metrics, and the like in as many ways as possible (e.g., resolution, power consumption, dynamic range, etc.) through both device architecture design as well as image acquisition processing. The technology used to manufacture image sensors has continued to advance at a great pace. For example, the demands of higher resolution and lower power consumption have encouraged the further miniaturization and integration of these devices.

A typical complementary metal oxide semiconductor (CMOS) image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which are read out as analog signals from the column bitlines and converted to digital values to produce digital images (i.e., image data) that represent the external scene.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 2 illustrates a one example of a photodiode array in accordance with the teachings of the present disclosure.

Figure 1:
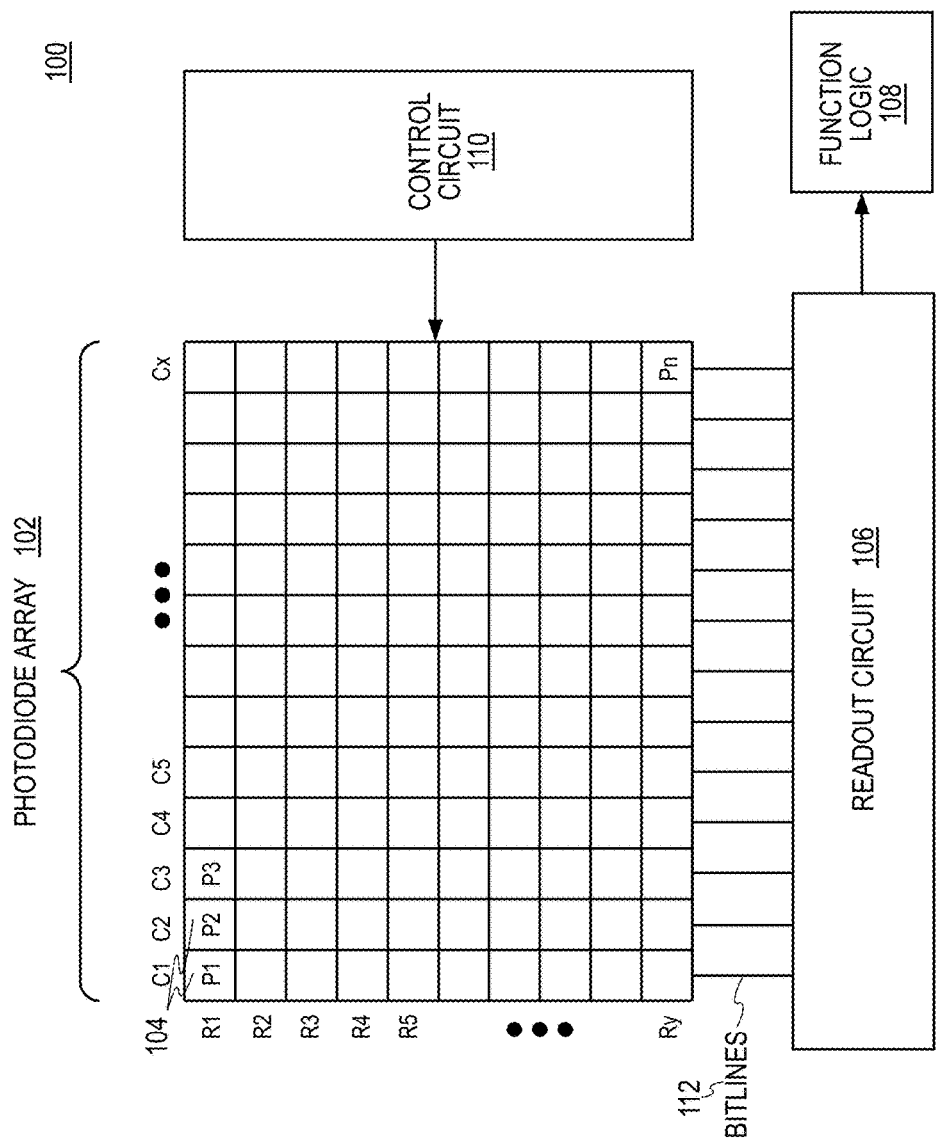
FIG. 1 illustrates one example of an imaging system including a photodiode array in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. In addition, common but well-understood elements that are useful or necessary in a commercially feasible embodiment are often not depicted in order to facilitate a less obstructed view of these various embodiments of the present invention.

DETAILED DESCRIPTION

Examples directed to an imaging system including a photodiode array with phase detection autofocus and image sensing photodiodes are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "over," "under," "above," "upper," "top," "bottom," "left," "right," "center," "middle," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of an imaging system including a photodiode array with phase detection autofocus (PDAF) and image sensing photodiodes are described. In various examples, the imaging system includes a plurality of photodiodes arranged in the photodiode array to generate charge in response to incident light. In the various examples, all photodiodes in the photodiode array can be used for both phase detection autofocus and image sensing. As such, all of the photodiodes in the photodiode array may have the same kind of microlenses, with their own color filters. The photodiode array includes a first photodiode and a second PDAF photodiode. First and second floating diffusions are configured to receive charge from the first and second photodiodes, respectively. An analog to digital converter (ADC) is configured to receive simultaneously a first bitline signal from the first floating diffusion through a first bitline capacitor, and a second bitline signal from the second floating diffusion through a second bitline capacitor. The ADC is configured to perform a first ADC conversion to generate a reference readout in response to the first and second bitline signals after a reset operation. The ADC is next configured to perform a second ADC conversion to generate a first half of a PDAF readout in response to the first and second bitline signals after charge is transferred from the first photodiode to the first floating diffusion. The ADC then configured to perform a third ADC operation to generate a full image readout in response to the first and second bitline signals after charge is transferred from the second photodiode to the second floating diffusion.

In the various examples, the imaging device also includes a plurality of transfer transistors. Each one of the plurality of transfer transistors is coupled to a corresponding one of the plurality of photodiodes. The plurality of transfer transistors includes a first transfer transistor and a second transfer transistor. The first transfer transistor is coupled between the first photodiode and a first floating diffusion. The second transfer transistor is coupled between the second photodiode and a second floating diffusion.

A plurality of reset transistors is also included. The plurality of reset transistors includes a first reset transistor and a second reset transistor. The first reset transistor is coupled between the first floating diffusion and a voltage supply. The second reset transistor is coupled between the second floating diffusion and the voltage supply.

A plurality of source follower transistors is also included. The plurality of source follower transistors includes a first source follower transistor and a second source follower transistor. The first source follower transistor has a gate coupled to the first floating diffusion and a source coupled to a first column bitline. In one example, the source of the first source follower transistor is coupled to the first column bitline through a first row select transistor. The second source follower transistor has a gate coupled to the second floating diffusion and a source coupled to a second column bitline. In one example, the source of the second source follower transistor is coupled to the second column bitline through a second row select transistor.

The ADC has an input coupled simultaneously to both the first column bitline through a first bitline capacitor and the second column bitline through a second bitline capacitor. The ADC is configured to perform the first ADC conversion in response to the first and second reset transistors being pulsed while the first and second transfer transistors are turned off to reset the first and second floating diffusions to determine a reference readout. The ADC is next configured to perform the second ADC conversion in response to the first transfer transistor being pulsed while the first and second reset transistors and the second transfer transistor are turned off to determine a first half of a PDAF readout. The ADC is then configured to perform the third ADC conversion in response to the second transfer transistor being pulsed while the first and second reset transistors and the first transfer transistor are turned off to determine a full image readout.

The first half of the PDAF readout may then be determined in response to determining a difference between the second ADC conversion and the first ADC conversion. A second half of a PDAF readout may be determined in response to determining a difference between the third ADC conversion and the second ADC conversion. PDAF information may be determined in response to evaluating the first half and second half PDAF readouts relative to each other. The full image readout may be determined in response to determining the difference between the third ADC conversion and the first ADC conversion. As such, both PDAF and image sensing readouts may be determined from the photodiodes of the imaging device with the three readouts and ADC conversions in accordance with the teachings of the present invention.

To illustrate, FIG. 1 illustrates one example of an imaging system 100 including an imaging device with an array of photodiodes including phase detection autofocus and image sensing photodiodes in accordance with the teachings of the present invention. In particular, imaging system 100 includes a photodiode array 102, a control circuit 110, a readout circuit 106, and function logic 108. In one example, photodiode array 102 is a two-dimensional (2D) array of photodiodes 104, (e.g., P1, P2, . . . , Pn), which can be utilized for both phase detection autofocus as well as image sensing in accordance with the teachings of the present invention. As illustrated in the depicted example, photodiodes 104 are arranged into rows (e.g., R1 to Ry) and columns (e.g., C1 to Cx) to acquire image data and/or focus data of a person, place, object, etc., which can then be used to acquire and render a 2D image of the person, place, object, etc.

In one example, each photodiode 104 in photodiode array 102 is configured to photogenerate image charge and/or phase detection autofocus charge in response to incident light. The image charge or phase detection autofocus charge generated in each photodiode 104 is transferred to a floating diffusion in each pixel circuit, which is converted to an image signal or a phase detection autofocus signal, which is then read out from each pixel circuit by readout circuit 106 through column bitlines 112. In various examples, the signals read out from photodiode array 102 may be amplified, digitized, and then transferred to function logic 108. In various examples, the readout circuit 106 includes amplification circuitry, analog to digital converters (ADC), or otherwise. In one example, the readout circuit 106 may read out a row of data at a time along column bitlines 112 as illustrated in FIG. 1, or may read out the data using a variety of other techniques (not illustrated), such as a serial readout or a full parallel readout of all pixel circuits simultaneously. The function logic 108 may store the image data or even manipulate the image data by applying post image effects (e.g., crop, rotate, remove red eye, adjust brightness, adjust contrast, or otherwise).

Figure 2:
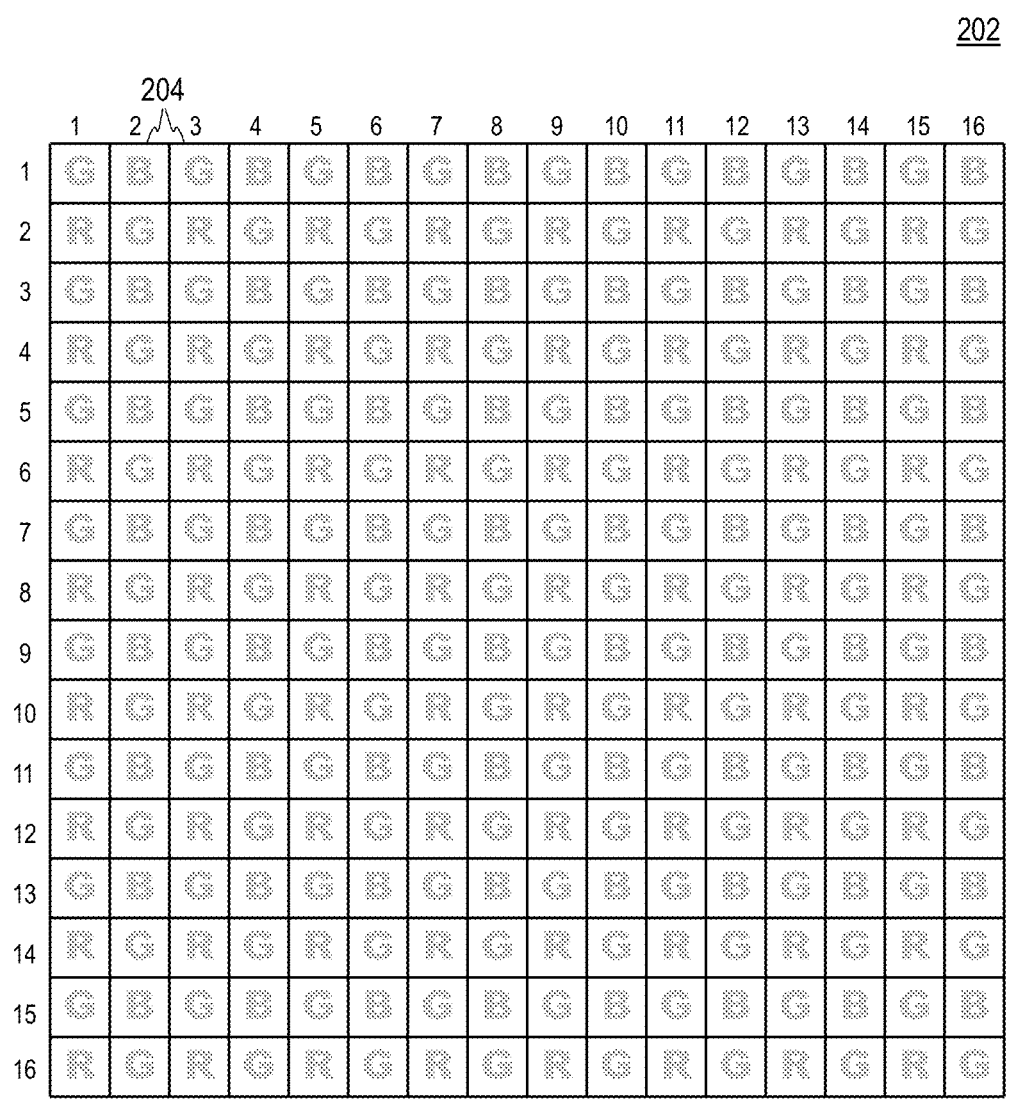

FIG. 2 illustrates one example of a photodiode array 202 of photodiodes 204 in accordance with the teachings of the present disclosure. In particular, the example depicted in FIG. 2 illustrates the photodiode array 202, which includes a plurality of photodiodes 204 arranged in rows and columns in the photodiode array to generate charge in response to incident light. In the various examples, the plurality of photodiodes 204 includes a first photodiode and a second photodiode.

The example depicted in FIG. 2 illustrates that photodiode array 202 is implemented in a 1C color pixel array. In particular, FIG. 2 illustrates photodiode array 202 implemented as a color pixel array including a Bayer pattern color filter array in 1C mode. In 1C mode, each color filter (e.g., R, G, B) of the Bayer pattern covers a single photodiode (e.g., a 1×1 grouping for each color channel R, G, B). In one example, an array of microlenses may also be disposed over photodiode array (e.g., over/under R, G, B color filters) and in one example may only cover a 1×1 pixel or photodiode area.

In one example, it is appreciated that pixels having the same color may be binned together (e.g., horizontally binned) across multiple column bitlines. As such, information that is generated from each photodiode 204 is summed or combined with information generated from nearby binned photodiodes 204 to generate combined information, and therefore sum the performance of each individual photodiode 204 to improve the performance of the photodiode array 202. For instance, in the example depicted in FIG. 2, a blue (B) photodiode in one column can be binned with another blue (B) photodiode in the same row, but nearby column of photodiode array 202. In other words, the photodiodes 204 are arranged in the photodiode array 202 such that nearby photodiodes having the same red (R), green (G), or blue (B) color may be binned with each other.

In operation, phase detection information is retrieved from the imaging device by comparing or evaluating the signal from one photodiodes with the signal from a nearby photodiode. In the depicted example, signals from nearby photodiodes having the same color in the same row and are compared. In other words, for example, the signal from the left side (e.g., left half) blue/green/red photodiode is compared with the signal from the nearby right side (e.g., right half) blue/green/red photodiode to determine horizontal PDAF information.

As will be described in greater detail below, in one example during operation, the pixel circuits of each photodiode of each nearby pair of photodiodes having the same color are reset. After the reset operation, signals from each pixel circuit of the two nearby photodiodes having the same color are read out simultaneously through separate column bitlines. A single ADC is coupled to both bitlines and digitizes simultaneously the reset signals received from both column bitlines during a first ADC conversion to determine a reference readout value. Next, the signal from one of the photodiodes of the two nearby photodiodes having the same color is coupled to one of the column bitlines, which is then read out and digitized simultaneously with the other column bitline by the single ADC during a second ADC conversion to determine a first half of a PDAF readout. Then, the signal from the other photodiode of the two nearby photodiodes having the same color is then coupled to the other column bitline. Both column bitlines are then readout and digitized simultaneously with the single ADC during a third ADC conversion to determine a full image readout in accordance with the teachings of the present invention. It is appreciated that the single reference readout value determined in response to the first ADC conversion may be utilized to determine a correlated double sampling (CDS) readouts of the PDAF readouts in accordance with the teachings of the present invention.

The first half of the PDAF readout may then be determined in response to determining a difference between the second ADC conversion and the first ADC conversion. A second half of a PDAF readout may be determined in response to determining a difference between the third ADC conversion and the second ADC conversion. PDAF information may be determined in response to evaluating the first half and second half PDAF readouts relative to each other. The full image readout may be determined in response to determining the difference between the third ADC conversion and the first ADC conversion. As such, both PDAF and image sensing readouts may be determined from the photodiodes of the imaging device with the three readouts and ADC conversions in accordance with the teachings of the present invention. Thus, it is appreciated that both PDAF and binned image sensing readouts are read out from photodiode array 202 without having to reset the pixel circuits a second time between readouts. It is appreciated that with only three readouts instead of four readouts, noise performance as well as frame rate performance is improved in accordance with the teachings of the present invention.

Figure 3A:
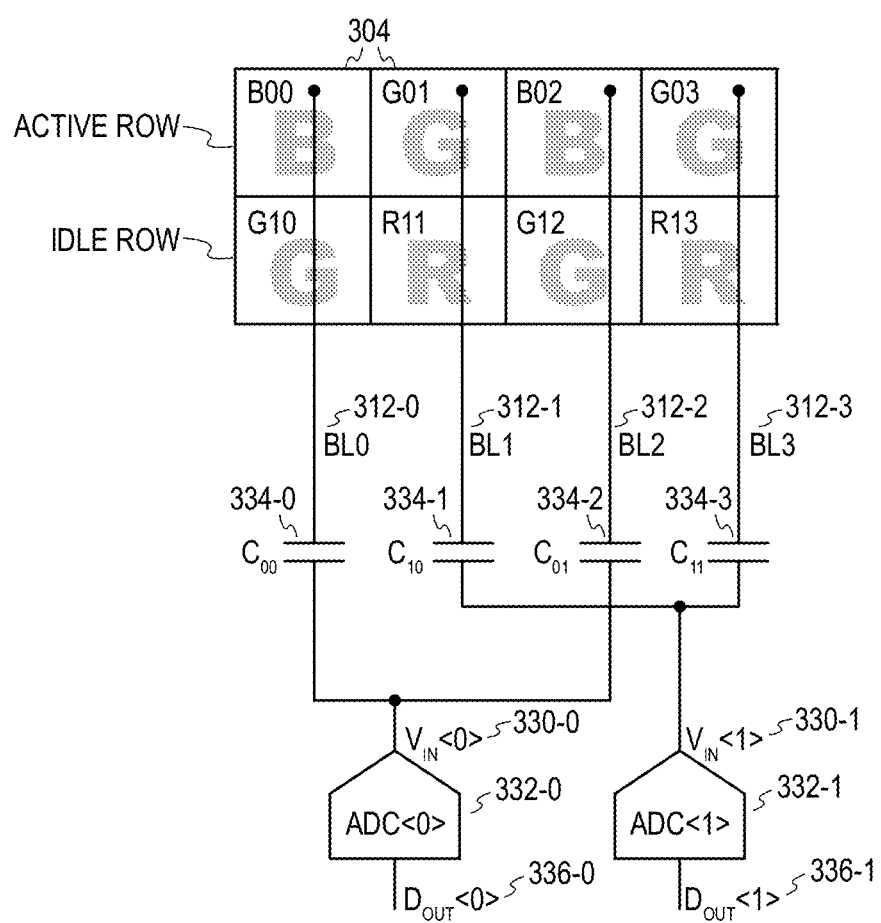
FIG. 3A illustrates a one example of a photodiode array implemented with a horizontal binning mode for 1C pixels having the same color in accordance with the teachings of the present invention.

FIG. 3A illustrates a one example of a photodiode array 302 implemented with a horizontal binning mode for 1C pixels in which bitlines coupled to pixels of the same color are binned in the horizontal direction in accordance with the teachings of the present invention. It is appreciated the photodiodes 304 included in photodiode array 302 of FIG. 3A may be examples of the photodiodes 204 included in photodiode array 202 as shown in FIG. 2, or an example of the photodiodes 104 included in photodiode array 102 as shown in FIG. 1, and that similarly named and numbered elements described above are coupled and function similarly below.

As shown in the example depicted in FIG. 3A, an active row of photodiode array 302 includes a plurality of photodiodes 304. The depicted example illustrates that photodiode array 302 includes an active row, which includes a blue photodiode B00, a green photodiode G01, a blue photodiode B02, and a green photodiode G03. An idle row of photodiode array 302 includes a green photodiode G10, a red photodiode R11, a green photodiode G12, and a red photodiode R13. When the active row is read out, bitline BL0 312-0 is coupled to the blue photodiode B00, bitline BL1 312-1 is coupled to the green photodiode G001 bitline BL2 312-2 is coupled to the blue photodiode B02, and bitline BL3 312-3 is coupled to the green photodiode G03.

With the horizontal binning mode for 1C pixels, the analog to digital converter ADC<0>332-0 is coupled to read out the nearby blue photodiodes B00 and B02 of the active row through bitline BL0 312-0 through bitline capacitor $C_{00}$ 334-0 and, bitline BL2 312-2 through bitline capacitor $C_{01}$ 334-2. Similarly, the analog to digital converter ADC<1>332-1 is coupled to read out the nearby green photodiodes B00 and B02 of the active row through bitline BL1 312-1 through bitline capacitor $C_{10}$ 334-1 and, bitline BL3 312-3 through bitline capacitor $C_{11}$ 334-3. As shown in the example, the resulting input voltage $V_{IN}$<0> 330-0 appears at the input of ADC<0> 332-0, which generates digital output signal $D_{OUT}$<0> 336-0. Similarly, the resulting input voltage $V_{IN}$<1> 330-1 appears at the input of ADC<1> 332-1, which generates digital output signal $D_{OUT}$<1> 336-1.

As mentioned, both PDAF information and horizontally binned image sensing information can be read out from the nearby pairs of photodiodes having the same color (e.g., B00/B02, G01/G03, etc.) with the three ADC conversions by the analog to digital converters ADC<0> 332-0 and ADC<1> 332-1 in accordance with the teachings of the present invention.

Figure 3B:
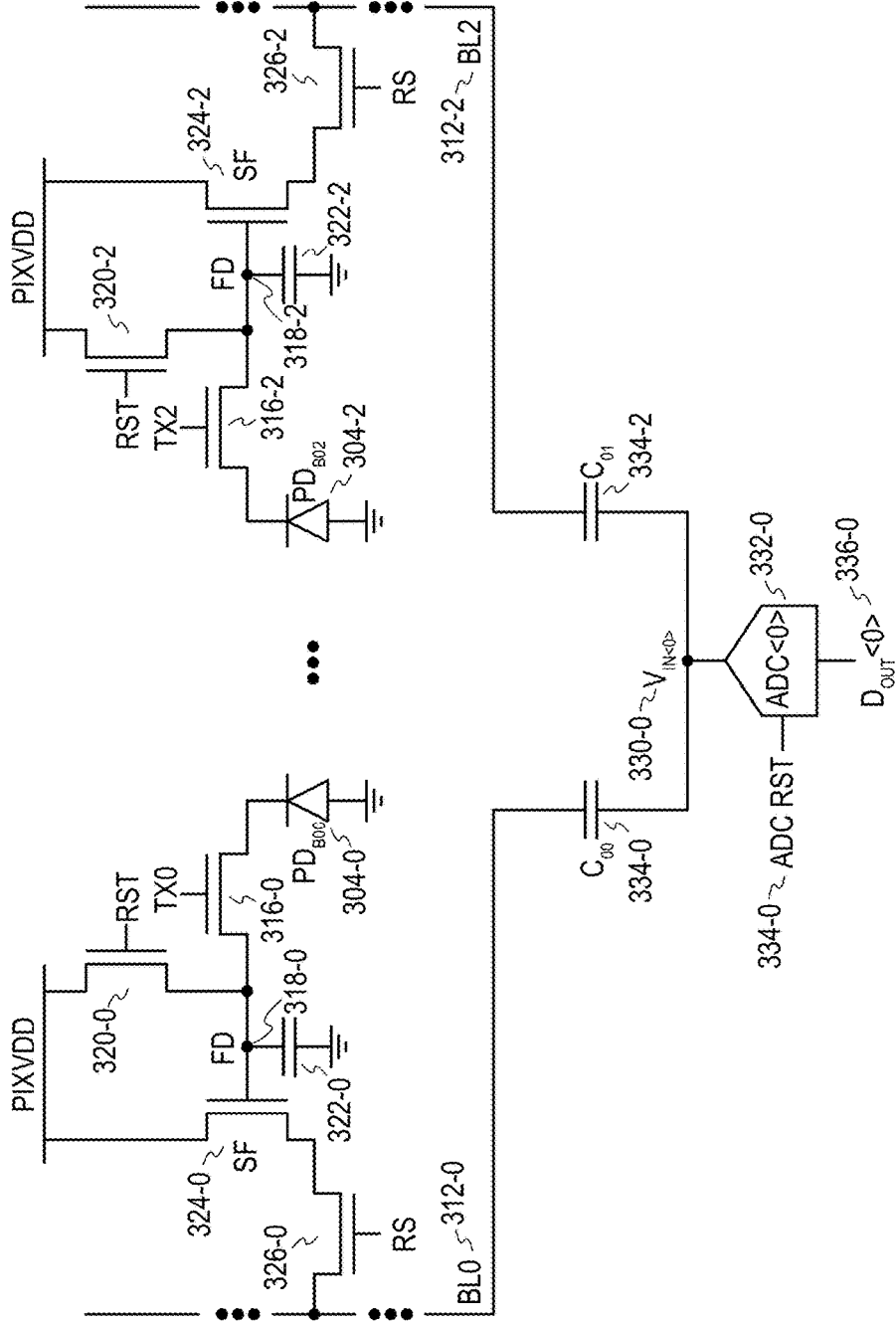
FIG. 3B illustrates one example schematic of two pixel circuits included in an imaging system with a photodiode array implemented with a horizontal binning mode for 1C pixels having the same color in accordance with the teachings of the present invention.

To illustrate, FIG. 3B shows one example schematic of two pixel circuits 314-0 and 314-2 included in an imaging system with a photodiode array in accordance with the teachings of the present invention. It is appreciated the pixel circuits 314-0 and 314-2 of FIG. 3B may be example schematics of the pixel circuits coupled to the photodiodes B00 and B02 illustrated in FIG. 3A, or examples of the pixel circuits coupled to the photodiodes 204 included in photodiode array 202 as shown in FIG. 2, or an examples of the pixel circuits coupled to photodiodes 104 included in photodiode array 102 as shown in FIG. 1, and that similarly named and numbered elements described above are coupled and function similarly below.

In the example depicted in FIG. 3B, pixel circuit 314-0 includes a photodiode $PD_{B00}$ 304-0, and pixel circuit 314-2 includes a photodiode $PD_{B02}$ 304-2. In the example, both photodiode $PD_{B00}$ 304-0 and photodiode $PD_{B02}$ 304-2 are configured to receive the same color light (e.g., blue). In addition, pixel circuits 314-0 and 314-2 are nearby pixel circuits in the same row but are separated by another pixel circuit having a photodiode configured to receive a different color (e.g., green), such as for example as illustrated in FIG. 3A.

In the illustrated example, pixel circuit 314-0 also includes a transfer transistor 316-0 that is coupled between photodiode $PD_{B00}$ 304-0 and a floating diffusion 318-0. Similarly, pixel circuit 314-2 also includes a transfer transistor 316-2 that is coupled between photodiode $PD_{B02}$ 304-2 and a floating diffusion 318-2. In operation, transfer transistor 316-0 is coupled to be controlled in response to a transfer control signal TX0 and transfer transistor 316-2 is coupled to be controlled in response to a transfer control signal TX2. As such, charge photogenerated in photodiode $PD_{B00}$ 304-0 in response to incident light is transferred to floating diffusion 318-0 in response to transfer control signal TX0 and charge photogenerated in photodiode $PD_{B02}$ 304-2 in response to incident light is transferred to floating diffusion 318-2 in response to transfer control signal TX2.

Continuing with the example depicted in FIG. 3B, a reset transistor 320-0 is coupled between floating 318-0 and a voltage supply (e.g., PIXVDD) in pixel circuit 314-0, and a reset transistor 320-2 is coupled between floating 318-2 and the voltage supply in pixel circuit 314-2. In operation, the reset transistor 320-0 is configured to reset pixel circuit 314-0 including the charge in floating diffusion 318-0, and the reset transistor 320-2 is configured to reset pixel circuit 314-2 including the charge in floating diffusion 318-2 in response to a reset control signal RST.

The depicted example also shows that pixel circuit 314-0 includes a source follower transistor 324-0, which has a gate coupled to the floating diffusion 318-0. In the example, the drain of the source follower transistor 324-0 is coupled to the voltage supply (e.g., PIXVDD), and the source of source follower transistor 324-0 is coupled to a first column bitline BL0 312-0 through a row select transistor 326-0. Thus, in other words, the source follower transistor 324-0 and the row select transistor 326-0 are coupled between the voltage supply (e.g., PIXVDD) and the first column bitline BL0 312-0. In operation, the charge that is transferred to floating diffusion 318-0 is coupled to the gate of the source follower transistor 318-0, which generates an output signal at the source of the source follower transistor 324-0, which is coupled to the first column bitline BL0 312-0 through the row select transistor 326-0 in response to the row select signal RS.

Similarly, the depicted example also shows that pixel circuit 314-2 includes a source follower transistor 324-2, which has a gate coupled to the floating diffusion 318-2. In the example, the drain of the source follower transistor 324-2 is coupled to the voltage supply (e.g., PIXVDD), and the source of source follower transistor 324-2 is coupled to a second column bitline BL2 312-2 through a row select transistor 326-2. Thus, in other words, the source follower transistor 324-2 and the row select transistor 326-2 are coupled between the voltage supply (e.g., PIXVDD) and the second column bitline BL2 312-2. In operation, the charge that is transferred to floating diffusion 318-2 is coupled to the gate of the source follower transistor 318-2, which generates an output signal at the source of the source follower transistor 324-2, which is coupled to the second column bitline BL2 312-2 through the row select transistor 326-2 in response to the row select signal RS.

The example depicted in FIG. 3B also illustrates a single analog to digital converter ADC<0> 332-0 that includes an input that is coupled simultaneously to both the first column bitline BL0 312-0 through a first bitline capacitor Coo 334-0 and the second column bitline BL2 312-2 through a second bitline capacitor $C_{01}$ 334-2. As such, the ADC<1> 332-0 is configured to perform ADC conversions of the analog signals received simultaneously from both pixel circuit 314-0 through first column bitline BL0 312-0 through first bitline capacitor Coo 334-0 and from pixel circuit 314-2 through second column bitline BL2 312-2 through second bitline capacitor $C_{01}$ 334-2. In the depicted example, the single analog input of ADC<1> 332-0 is shown as input voltage $V_{IN}$<0> 330-0 and the digital output of ADC<0> 332-0 is shown as a digital output signal $D_{OUT}$<0> 336-0. In one example, the ADC<0> 332-0 is coupled to be reset in response to an ADC reset signal 334.

Figure 4:
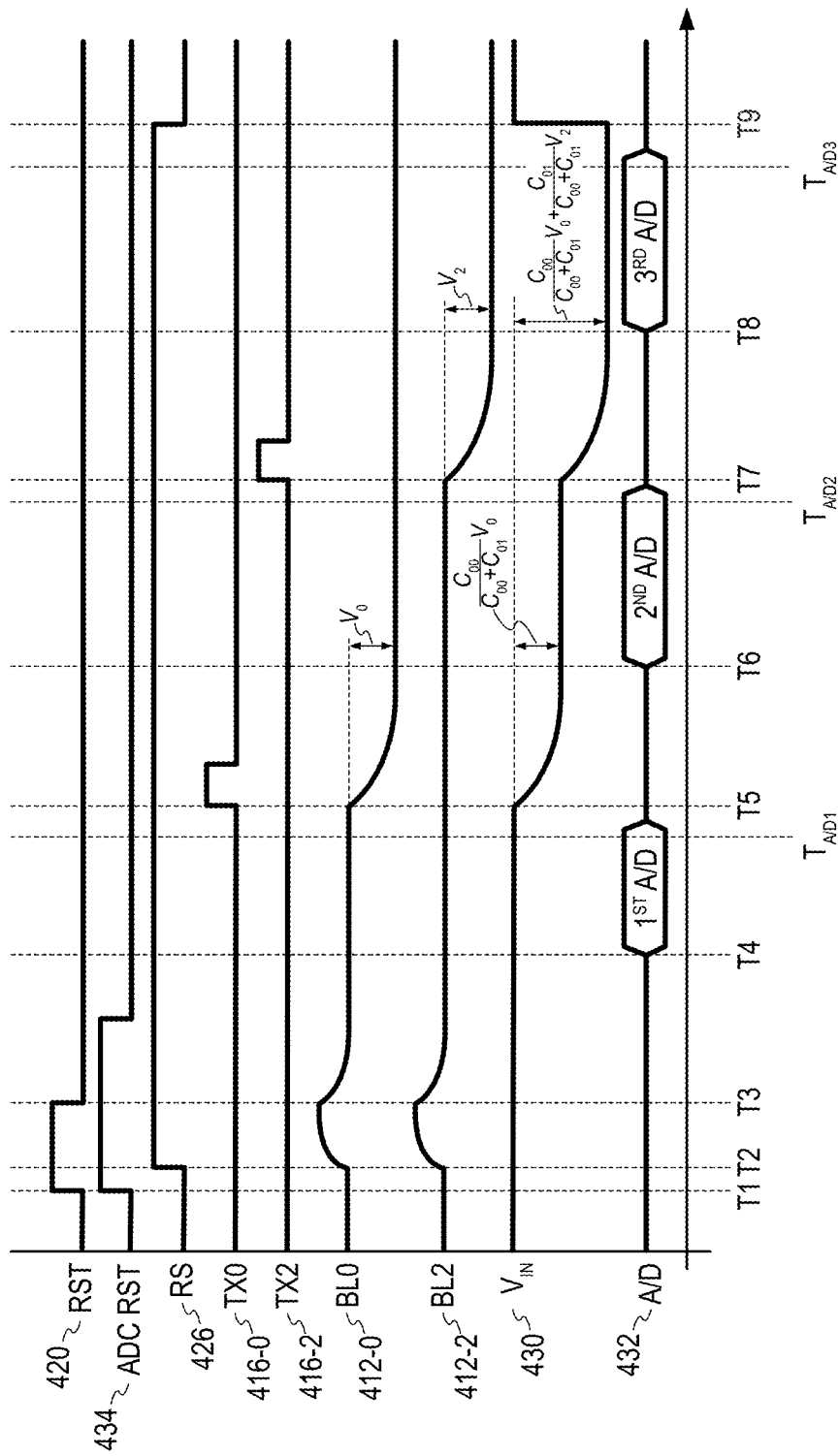
FIG. 4 illustrates one example timing diagram illustrating various signals in a pixel circuit included in an imaging system including a photodiode array from which phase detection autofocus and image sensing signals are generated and read out by an analog to digital converter accordance with the teachings of the present invention.

FIG. 4 illustrates one example timing diagram 428 illustrating various signals in pixel circuits included in an imaging system including a photodiode array from which phase detection autofocus signals and image signals are generated and read out by an analog to digital converter accordance with the teachings of the present invention. It is appreciated that the waveforms illustrated in FIG. 4 may be examples of waveforms found in pixel circuits 314-0 and 314-2 of FIG. 3B, and/or one of the pixel circuits coupled to the photodiodes included in photodiode array 202 as shown in FIG. 2, and/or imaging system 100 of FIG. 1, and that similarly named and numbered elements referenced below are coupled and function similar to as described above.

In the example depicted in FIG. 4, it is assumed that both photodiode $PD_{B00}$ 304-0 and photodiode $PD_{B02}$ 304-2 in FIG. 3B are configured to receive the same color light (e.g., blue) and that pixel circuits 314-0 and 314-2 are nearby pixel circuits in the same row but are separated by another pixel circuit having a photodiode configured to receive a different color (e.g., green), such as for example as illustrated in FIG. 3A. As such, it is assumed that the signals from pixel circuits 314-0 and 314-2 are illustrated in timing diagram 428 of FIG. 4. As shown in FIG. 4, timing diagram 428 illustrates a reset transistor control signal 420, an ADC reset signal 434, a row select transistor control signal 426, transfer transistor control signal TX0 416-0, transfer transistor control signal TX2 416-2, first column bitline signal BL0 412-0, second column bitline signal BL2 412-2, input voltage signal $V_{IN}$ 430, and analog to digital converter (ADC) conversion operations 432.

At time T1, the reset transistor control signal 420 and the ADC reset signal 434 are asserted or pulsed while the transfer transistor control signals TX0 416-0 and TX2 416-2 remain turned off. As such, the reset transistors 320-0 and 320-2 are turned on while the transfer transistors 316-0 and 316-2 are turned off to reset the pixel circuits 314-0 and 314-2 including floating diffusions 318-0 and 318-2 as well as the ADC 332<0> at time T1.

As the floating diffusions 318-0 and 318-2 and the ADC 332<0> are being reset with the reset transistors 320-0 and 320-2 being turned on, the row select transistor control signal 426 is then asserted at time T2, which turns on the row select transistors 326-0 and 326-2. As such, the first column bitline BL0 412-0 and second column bitline BL2 412-2 signals begin to rise as shown in FIG. 4 at time T2.

At time T3 after the pixel circuits 314-0 and 314-2 and the floating diffusions 318-0 and 318-2 have been reset, the reset transistor control signal 420 is de-asserted or the pulse in reset transistor control signal 420 ends, which turns off the reset transistors 320-0 and 320-2 at time T3. As such, the first column bitline BL0 412-0 and second column bitline BL2 412-2 signals begin to settle down to their reset or reference levels as shown in FIG. 4 at time T3. After time T3, the ADC reset operation is complete and the ADC reset signal 434 is de-asserted or the pulse in ADC reset signal 434 ends as shown.

After the pixel circuits 314-0 and 314-2, floating diffusions 318-0 and 318-2, and ADC<0> 332 have been reset and the first column bitline BL0 412-0 and second column bitline BL2 412-2 signals have settled to their reset or reference levels, an ADC conversion operation 432 is performed by ADC<0> 332-0 at time T4 to output a first ADC conversion of the input voltage $V_{IN}$ 430 at time $T_{A/D1}$, which is responsive to the first column bitline BL0 412-0 and second column bitline BL2 412-2 signal values, which are representative of the reference readouts or a reset level readouts of the pixel circuits 314-0 and 314-2 at time T4.

Once the first ADC conversion 432 of the input voltage $V_{IN}$ 430 is complete at time $T_{A/D1}$, the transfer transistor control signal TX0 416-0 is asserted or pulsed at time T5 while the reset transistor control signal 420 and the transfer transistor control signal TX2 416-2 remain in the off state. Thus, the transfer transistor 316-0 is turned on at time T5 while the transfer transistor 316-2 remains turned off at time T5. As such, the charge that is photogenerated in photodiode $PD_{B00}$ 304-0 is transferred to the floating diffusion 318-0 at time T5.

As the charge is transferred to floating diffusion 318-0 at time T5 from the photodiode $PD_{B00}$ 304-0, the first column bitline BL0 412-0 voltage begins to fall as shown, which is reflected in the input voltage $V_{IN}$ 430 also falling accordingly at time T5 at shown. It is also noted that the second column bitline BL2 412-2 voltage remains fixed at the respective reset or reference level at time T5 as the transfer transistor 316-2 remains turned off at time T5.

After the charge has been transferred from photodiode $PD_{B00}$ 304-0 to the floating diffusion 318-0, the transfer transistor control signal TX0 416-0 is de-asserted, which turns off the transfer transistor 316-0. After the first column bitline BL0 412-0 voltage and the input voltage $V_{IN}$ 430 have settled, a second ADC conversion operation 432 is performed by ADC 332 at time T6 to output a second ADC conversion of the input voltage $V_{IN}$ 430 at time $T_{A/D2}$, which is representative of a first half (e.g., left half) PDAF readout from pixel circuit 314-0 at time T6.

As noted in FIG. 4, if it is assumed that the voltage drop of the first column bitline BL0 412-0 voltage relative to the voltage after the reset operation is equal to Vo, then the voltage drop of the input voltage $V_{IN}$ 430 at the input of the ADC<0> 332-0 relative to the voltage after the reset operation can be determined based on Equation (1) below:

$$\frac{C_{00}}{C_{00} + C_{01}} V_0 \qquad (1)$$

$C_{00}$ is the capacitance value of the first bitline capacitor $C_{00}$ 334-0 and Cm is the capacitance value of the second bitline capacitor $C_{01}$ 334-2.

Once the second ADC conversion 432 of the input voltage $V_{IN}$ 430 is complete at time $T_{A/D2}$, the transfer transistor control signal TX2 416-2 is asserted or pulsed at time T7 while the reset transistor control signal 420 and the transfer transistor control signal TX0 416-0 remain in the off state. Thus, the transfer transistor 316-2 is turned on at time T7 while the transfer transistor 316-0 remains turned off at time T7. As such, the charge that is photogenerated in photodiode $PD_{B02}$ 304-2 is transferred to floating diffusion 318-2 at time T7. It is noted that the charge in floating diffusion 318-0 is not reset a second time prior to the transfer of the charge from $PD_{B02}$ 304-2 to floating diffusion 318-2 in accordance with the teachings of the present invention.

With the charge transferred to floating diffusion 318-2 at time T7 from the photodiode $PD_{B02}$ 304-2, the bitline voltage of second column bitline BL2 412-2 begins to fall at time T7, which is also reflected in the input voltage $V_{IN}$ 430 at the input of the ADC<0> 332-0 falling again accordingly at time T7 at shown. After the charge has been transferred from photodiode $PD_{B02}$ 304-2 to the floating diffusion 318-2, the transfer transistor control signal TX2 416-2 is de-asserted, which turns off the transfer transistor 316-2. After the bitline voltage of second column bitline BL2 412-2 and the input voltage $V_{IN}$ 430 have settled again, a third ADC conversion operation 432 is performed by ADC<0> 332-0 at time T8 to output a third ADC conversion of the input voltage $V_{IN}$ 430 at time $T_{A/D3}$, which is used to determine a full image readout of pixel circuits 314-0 and 314-2 at time T8.

As noted in FIG. 4, if it is assumed that the voltage drop of the second column bitline BL2 412-2 voltage relative to the voltage after the reset operation is equal to $V_2$, and that the voltage drop of the first column bitline BL0 412-0 voltage relative to the voltage after the reset operation remains equal to Vo, then the voltage drop of the input voltage $V_{IN}$ 430 at the input of ADC<0> 332-0 relative to the voltage after the reset operation can be determined based on Equation (2) below:

$$\frac{C_{00}}{C_{00} + C_{01}} V_0 + \frac{C_{01}}{C_{00} + C_{01}} V_2 \qquad (2)$$

$C_{00}$ is the capacitance value of the first bitline capacitor $C_{00}$ 334-0 and Cm is the capacitance value of the second bitline capacitor $C_{01}$ 334-2.

Once the third ADC conversion 432 of the input voltage $V_{IN}$ 430 is complete at time $T_{A/D3}$, the row select transistor control signal 426 is then de-asserted at time T9, which turns off the row select transistors 326-0 and 326-2, causing the input voltage $V_{IN}$ 430 to return to its idle state value.

In summary, it is appreciated that three ADC conversions 432 are performed to determine the PDAF and full image readouts with correlated double sampling (CDS) in accordance with the teachings of the present invention. The first ADC conversion (e.g., $D_{OUT}(T_{A/D1})$) is used to obtain the reference readout at time $T_{A/D1}$, the second ADC conversion (e.g., $D_{OUT}(T_{A/D2})$) is used to obtain the PDAF readout of the left half of the nearby photodiodes having the same color at time $T_{A/D2}$, and the third ADC conversion (e.g., $D_{OUT}(T_{A/D3})$) is used to obtain a full horizontally binned image readout from the two nearby photodiodes having the same color at time $T_{A/D3}$.

In one example, it is assumed that the capacitance of the first bitline capacitor $C_{00}$ 334-0 is equal to the capacitance of the second bitline capacitor $C_{01}$ 334-2, or $C_{00}=C_{01}$. In addition, in the example, it also assumed that the gain $A_L$ of the left side or the first column bitline 312-0 side of the ADC<0> 332-0 is equal to the gain $A_R$ of the right side or second column bitline 312-2 side of the ADC<0> 332-0, and that both are equal to 2, or $A_L=A_R=2$.

As such, in the signal processing, the PDAF reading of the left half can be determined according to Equation (3) below:

$$PDAF_{LEFT}=A_L*D_{OUT}(T_{A/D2})-D_{OUT}(T_{A/D1}) \quad (3)$$

In the example, the second ADC conversion is equal to $D_{OUT}(T_{A/D2})$ and the first ADC conversion is equal to $D_{OUT}(T_{A/D1})$.

In one example, the PDAF reading of the right half can be determined according to Equation (4) below:

$$PDAF_{RIGHT}=A_R(D_{OUT}(T_{A/D3})-D_{OUT}(T_{A/D2})) \quad (4)$$

In the example, the third ADC conversion is equal to $D_{OUT}(T_{A/D3})$ and the second ADC conversion is equal to $D_{OUT}(T_{A/D2})$.

In one example, the binned image reading of both photodiodes can be determined according to Equation (5) below:

$$IMAGE_{BINNED}=D_{OUT}(T_{A/D3})-D_{OUT}(T_{A/D1}) \quad (5)$$

In the example, the third ADC conversion is equal to $D_{OUT}(T_{A/D3})$ and the first ADC conversion is equal to $D_{OUT}(T_{A/D1})$.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. An imaging device, comprising:
a plurality of photodiodes arranged in a photodiode array to generate charge in response to incident light, wherein the photodiode array includes a first photodiode and a second photodiode;
first and second floating diffusions configured to receive charge from the first and second photodiodes, respectively; and
an analog to digital converter (ADC) configured to receive simultaneously a first bitline signal from the first floating diffusion through a first bitline capacitor, and a second bitline signal from the second floating diffusion through a second bitline capacitor, wherein the ADC is configured to perform a first ADC conversion to generate a reference readout in response to the first and second bitline signals after a reset operation, wherein the ADC is next configured to perform a second ADC conversion to generate a first half of a phase detection autofocus (PDAF) readout in response to the first and second bitline signals after charge is transferred from the first photodiode to the first floating diffusion, wherein the ADC then configured to perform a third ADC operation to generate a full image readout in response to the first and second bitline signals after charge is transferred from the second photodiode to the second floating diffusion.

2. The imaging device of claim 1, further comprising:
a plurality of transfer transistors, wherein each one of the plurality of transfer transistors is coupled to a corresponding one of the plurality photodiodes, wherein the plurality of transfer transistors includes a first transfer transistor coupled between the first photodiode and the first floating diffusion, and a second transfer transistor coupled between the second photodiode and the second floating diffusion;
a plurality of reset transistors including a first reset transistor and a second reset transistor, wherein the first reset transistor is coupled between the first floating diffusion and a voltage supply, wherein the second reset transistor is coupled between the second floating diffusion and the voltage supply; and
a plurality of source follower transistors including a first source follower transistor and a second source follower transistor, wherein the first source follower transistor has a gate coupled to the first floating diffusion and a source coupled to a first column bitline, wherein the second source follower transistor has a gate coupled to the second floating diffusion and a source coupled to a second column bitline, wherein the ADC is configured to receive simultaneously a first bitline signal from the first floating diffusion through the first column bitline and the first bitline capacitor, and the second bitline signal from the second floating diffusion through the second column bitline and the second bitline capacitor.

3. The imaging device of claim 2, further comprising a plurality of row select transistors including a first row select transistor and a second row select transistor,
wherein the first row select transistor is coupled to the first source follower transistor, wherein the first source follower transistor and the first row select transistor are coupled between the voltage supply and the first column bitline,
wherein the second row select transistor is coupled to the second source follower transistor, wherein the second source follower transistor and the second row select transistor are coupled between the voltage supply and the second column bitline.

4. The imaging device of claim 3, wherein the reset operation includes the first and second reset transistors being pulsed while the first and second transfer transistors are turned off to reset the first and second floating diffusions.

5. The imaging device of claim 3, wherein the second ADC conversion is performed in response to the first transfer transistor being pulsed while the first and second reset transistors and the second transfer transistor are turned off.

6. The imaging device of claim 3, wherein the third ADC conversion is performed in response to the second transfer transistor being pulsed while the first and second reset transistors and the first transfer transistor are turned off.

7. The imaging device of claim 3,
wherein the first photodiode, the first transistor, the first floating diffusion, the first reset transistor, the first source follower transistor, and the first row select transistor are included in a first pixel circuit, and
wherein the second photodiode, the second transistor, the second floating diffusion, the second reset transistor, the second source follower transistor, and the second row select transistor are included in a second pixel circuit.

8. The imaging device of claim 7, wherein a third pixel circuit is disposed between the first pixel circuit and the second pixel circuit.

9. The imaging device of claim 8, further comprising a color filter array disposed over the photodiodes array, wherein the first pixel circuit and the second pixel circuit are disposed under respective first and second color filters of the color filter array having a same first color, wherein the third pixel circuit is disposed under a third color filter of the color filter array having a different second color.

10. The imaging device of claim 1, wherein the first half of the PDAF readout is determined in response to a difference between the second ADC conversion and the first ADC conversion.

11. The imaging device of claim 10, wherein the second ADC conversion is multiplied by a first gain of the ADC when the difference between the second ADC conversion and the first ADC conversion is determined.

12. The imaging device of claim 10, wherein a second half of the PDAF readout is determined in response to a difference between the third ADC conversion and the second ADC conversion.

13. The imaging device of claim 12, wherein the difference between the third ADC conversion and the second ADC conversion is multiplied by a second gain of the ADC when determining the second half of the PDAF readout.

14. The imaging device of claim 12, wherein the first half of the PDAF readout is a top half of the PDAF readout, and the second half of the PDAF readout is a bottom half of the PDAF readout.

15. The imaging device of claim 12, wherein the first half of the PDAF readout is a left half of the PDAF readout, and the second half of the PDAF readout is a right half of the PDAF readout.

16. The imaging device of claim 1, wherein the full image readout is determined in response to a difference between the third ADC conversion and the first ADC conversion.

17. The imaging device of claim 1, wherein the second ADC conversion is representative of a first voltage drop on the first column bitline multiplied by a capacitance of the first bitline capacitor divided by a sum of the capacitance of the first bitline capacitor and a capacitance of the second bitline capacitor.

18. The imaging device of claim 17, wherein the third ADC conversion is representative of a sum of the second ADC conversion and a second voltage drop on the second column bitline multiplied by the capacitance of the second bitline capacitor divided by the sum of the capacitance of the first bitline capacitor and the capacitance of the second bitline capacitor.

19. An imaging system, comprising:
a plurality of photodiodes arranged in a photodiode array to generate charge in response to incident light, wherein the photodiode array includes a first photodiode and a second photodiode;
first and second floating diffusions configured to receive charge from the first and second photodiodes, respectively;
a control circuit coupled to the photodiode array to control operation of the photodiode array; and
a readout circuit coupled to the photodiode array to read out signals from the photodiode array through a plurality of column bitlines, wherein the plurality of column bitlines includes a first column bitline and a second column bitline,
wherein the readout circuit includes an analog to digital converter (ADC) coupled to the plurality of column bitlines to generate digital representations of the signals from the photodiode array, wherein the ADC is configured to receive simultaneously a first bitline signal from the first floating diffusion through the first column bitline and a first bitline capacitor, and a second bitline signal from the second floating diffusion through the second column bitline and a second bitline capacitor,
wherein the ADC is configured to perform a first ADC conversion to generate a reference readout in response to the first and second bitline signals after a reset operation, wherein the ADC is next configured to perform a second ADC conversion to generate a first half of a phase detection autofocus (PDAF) readout in response to the first and second bitline signals after charge is transferred from the first photodiode to the first floating diffusion, wherein the ADC then configured to perform a third ADC operation to generate a full image readout in response to the first and second bitline signals after charge is transferred from the second photodiode to the second floating diffusion.

20. The imaging system of claim 19, further comprising function logic coupled to the readout circuit to store digital representations of the signals from the photodiode array.

21. The imaging system of claim 19, further comprising:
a plurality of transfer transistors, wherein each one of the plurality of transfer transistors is coupled to a corresponding one of the plurality photodiodes, wherein the plurality of transfer transistors includes a first transfer transistor coupled between the first photodiode and the first floating diffusion, and a second transfer transistor coupled between the second photodiode and the second floating diffusion;
a plurality of reset transistors including a first reset transistor and a second reset transistor, wherein the first reset transistor is coupled between the first floating diffusion and a voltage supply, wherein the second reset transistor is coupled between the second floating diffusion and the voltage supply; and
a plurality of source follower transistors including a first source follower transistor and a second source follower transistor, wherein the first source follower transistor has a gate coupled to the first floating diffusion and a source coupled to the first column bitline, wherein the second source follower transistor has a gate coupled to the second floating diffusion and a source coupled to the second column bitline, wherein the ADC is configured to receive simultaneously the first bitline signal from the first floating diffusion through the first column bitline and the first bitline capacitor, and the second bitline signal from the second floating diffusion through the second column bitline and the second bitline capacitor.

22. The imaging system of claim 21, further comprising a plurality of row select transistors including a first row select transistor and a second row select transistor, wherein the first row select transistor is coupled to the first source follower transistor, wherein the first source follower transistor and the first row select transistor are coupled between the voltage supply and the first column bitline, wherein the second row select transistor is coupled to the second source follower transistor, wherein the second source follower transistor and the second row select transistor are coupled between the voltage supply and the second column bitline.

23. The imaging system of claim 22, wherein the reset operation includes the first and second reset transistors being pulsed while the first and second transfer transistors are turned off to reset the first and second floating diffusions.

24. The imaging system of claim 22, wherein the second ADC conversion is performed in response to the first transfer transistor being pulsed while the first and second reset transistors and the second transfer transistor are turned off.

25. The imaging system of claim 22, wherein the third ADC conversion is performed in response to the second transfer transistor being pulsed while the first and second reset transistors and the first transfer transistor are turned off.

26. The imaging system of claim 22,
wherein the first photodiode, the first transistor, the first floating diffusion, the first reset transistor, the first source follower transistor, and the first row select transistor are included in a first pixel circuit, and
wherein the second photodiode, the second transistor, the second floating diffusion, the second reset transistor, the second source follower transistor, and the second row select transistor are included in a second pixel circuit.

27. The imaging system of claim 26, wherein a third pixel circuit is disposed between the first pixel circuit and the second pixel circuit.

28. The imaging system of claim 27, further comprising a color filter array disposed over the photodiodes array, wherein the first pixel circuit and the second pixel circuit are disposed under respective first and second color filters of the color filter array having a same first color, wherein the third pixel circuit is disposed under a third color filter of the color filter array having a different second color.

29. The imaging system of claim 19, wherein the first half of the PDAF readout is determined in response to a difference between the second ADC conversion and the first ADC conversion.

30. The imaging system of claim 29, wherein the second ADC conversion is multiplied by a first gain of the ADC when the difference between the second ADC conversion and the first ADC conversion is determined.

31. The imaging system of claim 29, wherein a second half of the PDAF readout is determined in response to a difference between the third ADC conversion and the second ADC conversion.

32. The imaging system of claim 31, wherein the difference between the third ADC conversion and the second ADC conversion is multiplied by a second gain of the ADC when determining the second half of the PDAF readout.

33. The imaging system of claim 31, wherein the first half of the PDAF readout is a top half of the PDAF readout, and the second half of the PDAF readout is a bottom half of the PDAF readout.

34. The imaging system of claim 31, wherein the first half of the PDAF readout is a left half of the PDAF readout, and the second half of the PDAF readout is a right half of the PDAF readout.

35. The imaging system of claim 19, wherein the full image readout is determined in response to a difference between the third ADC conversion and the first ADC conversion.

36. The imaging system of claim 19, wherein the second ADC conversion is representative of a first voltage drop on the first column bitline multiplied by a capacitance of the first bitline capacitor divided by a sum of the capacitance of the first bitline capacitor and a capacitance of the second bitline capacitor.

37. The imaging system of claim 36, wherein the third ADC conversion is representative of a sum of the second ADC conversion and a second voltage drop on the second column bitline multiplied by the capacitance of the second bitline capacitor divided by the sum of the capacitance of the first bitline capacitor and the capacitance of the second bitline capacitor.

* * * * *